Figure 1:
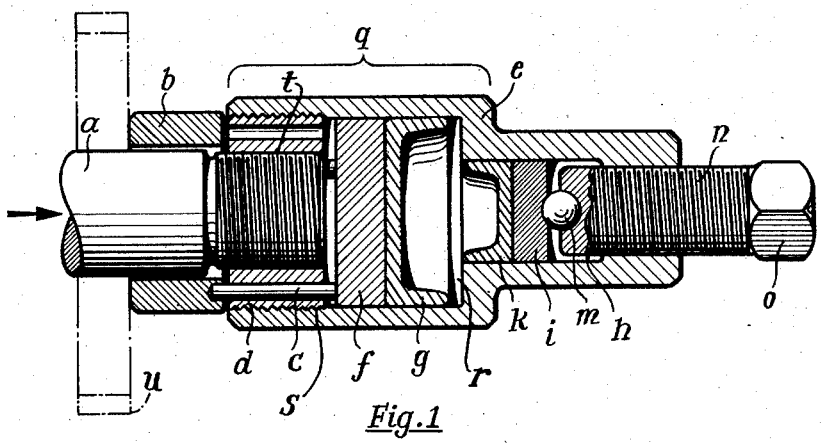

Nov. 12, 1957  A. SCHREM  2,812,684
ARBOR NUT WITH FLUID PRESSURE ACTUATED SPACER ENGAGING PINS
Filed July 27, 1954

Inventor:
Albert Schrem

United States Patent Office 2,812,684
Patented Nov. 12, 1957

2,812,684

ARBOR NUT WITH FLUID PRESSURE ACTUATED SPACER ENGAGING PINS

Albert Schrem, Giengen (Brenz), Germany

Application July 27, 1954, Serial No. 446,005

Claims priority, application Germany July 28, 1953

3 Claims. (Cl. 85—32)

The present invention relates to gripping devices.

More particularly, the present invention relates to a fluid pressure apparatus which is adapted to greatly multiply manual force applied thereto and to apply this force to a member or spacer for urging this member into a predetermined position so as to clamp any desired tool between the latter member and another member or spacer on the opposite side of the tool to be clamped.

For example, in the case of machine tools such as milling machines, it is conventional to locate a milling cutter on the arbor of the machine by arranging a row of spacers on the arbor on opposite sides of the milling cutter and then urging these spacers together with the milling cutter therebetween for clamping the latter to the arbor for rotation therewith. Usually, the urging of the spacers toward each other is brought about by the turning of a very large nut mounted on a threaded end portion of an arbor, and an extremely large wrench, which may perhaps be a ½ meter in length, is generally required to apply to the nut a force sufficient to fix and hold the milling cutter against rotation with respect to the arbor. This manner of fixing a milling cutter on an arbor is very undesirable not only because of the unusually great wear and tear produced on the parts of the machine by the application of the large wrench thereto, but also because of the danger of injuring other apparatus and people located adjacent the large wrench during manipulation thereof.

It is an object of the present invention to provide a fluid pressure apparatus of the above type which is of an exceedingly simple construction and which is very reliable in operation.

A further object of the present invention is to provide a fluid pressure apparatus which is in the form of a relatively small independent unit capable of being very easily mounted on and removed from an operative position on a shaft such as an arbor of a milling machine or the like.

With the above objects in view, the present invention mainly consists of a fluid pressure apparatus for urging a tool on an arbor or the like into a predetermined position, this apparatus including a first cylinder adapted to be mounted on an end of an arbor adjacent a spacer thereon, and a first piston means mounted in the first cylinder for sliding movement therein. A transmitting means is provided to transmit movement from this first piston means to the exterior of the first cylinder to a spacer or the like on the arbor. A second cylinder of a smaller diameter than the first cylinder communicates with the latter at an end wall thereof distant from the transmitting means, and a second piston means is in the second cylinder and defines with the first and second cylinders and the first piston means a chamber in which a pressure fluid is adapted to be located. A manually operable means is mounted on the second cylinder for shifting the second piston means toward the first piston means.

Figure 2:
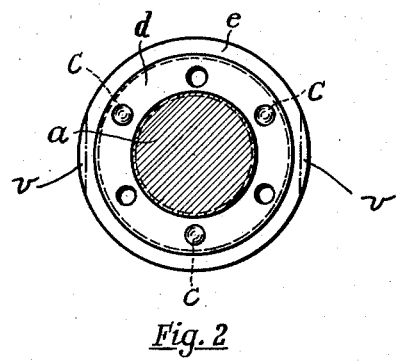

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a sectional view taken axially through an apparatus constructed in accordance with the present invention; and Fig. 2 is a view of the apparatus of Fig. 1 as seen from the left in the direction of the arrow at the left of Fig. 1 and without the spacer $b$ shown in Fig. 1.

Referring now to the drawings, Fig. 1 shows the right free end portion of an arbor $a$ which is threaded at its free end and which carries a plurality of spacers distributed on opposite sides of a milling cutter or other working tool $u$. Only the right end spacer $b$ is shown in Fig. 1.

The apparatus of the invention includes a housing $e$ having a first cylinder $r$ and a second cylinder $h$ of a smaller diameter than cylinder $r$ and integral and coaxial with the cylinder $r$, this cylinder $h$ communicating with the right end wall of cylinder $r$, as viewed in Fig. 1. The term "cylinder" as used throughout the specification and claims is intended to include a tubular member having a circular bore adapted to receive a piston for sliding movement therein, regardless of the exterior configuration of such tubular member.

The left end portion of cylinder $r$ is internally threaded at $s$ to cooperate with the outer threads of an annular member $d$ carried by the housing $e$ at its left end portion, as viewed in Fig. 1, and this annular member $d$ is provided at its inner periphery with threads of the same size as the threads $t$ on the free end of the arbor $a$, so that the annular member $d$ serves to removably mount the apparatus of the invention on the arbor $a$, as shown in Fig. 1. The annular member $d$ is formed with a plurality of bores distributed about the same and extending parallel to the axis of cylinder $r$, and a plurality of pins $c$ are mounted in these bores and are longer than annular member $d$ to transmit a force to the spacer $b$ in a manner described below. Three bores and pins $c$ may be provided.

Within the cylinder $r$ is located a piston means made up of a piston proper $f$ and a sealing member $g$, and mounted within the cylinder $h$ is a second piston means in the form of a piston proper $i$ and a sealing member $k$. Thus, the second piston means $i$, $k$ defines together with the cylinders $h$ and $r$ and the first piston means, $f$, $g$ a chamber in which a fluid such as a non-compressible liquid may be located so that when the piston means $i$, $k$ is moved to the left, as viewed in Fig. 1, this movement will be transmitted to the piston means $f$, $g$.

The right free end portion of cylinder $h$ is internally threaded and a manually operable means in the form of a screw $n$ and a ball $m$ engages the piston $i$, this screw $n$ being in threaded engagement with the cylinder $h$ and extending toward the piston $i$. The left end of screw $n$ and the right face of piston $i$, as viewed in Fig. 1, are formed with recesses which support the ball $m$, and the right end of screw $n$ is formed with flats $o$ so that the screw $n$ may be turned with a wrench to urge the piston $i$ to the left, as viewed in Fig. 1.

The operation of the above described apparatus is believed to be obvious. A fluid is located between sealing members $g$ and $k$ and the apparatus is mounted on the threads at the end of the arbor $a$ next to the spacer $b$. The part $q$ of the housing may be provided at its outer surface with flats $v$ or the like so that the apparatus may be turned onto and removed from the arbor $a$ with any suitable wrench. The screw $n$ may be easily turned so as to shift to the left, as viewed in Fig. 1. The pins c urge the spacer b to the left, as viewed in Fig. 1, and a wrench of relatively small size may be applied to the flats o of screw n to greatly increase the force applied against the spacer b by the pins c. It will be understood that a series of spacers arranged on opposite sides of a milling cutter on arbor a will thus tightly clamp the milling cutter on the arbor although a relatively small force is applied to the screw n. In order to remove the apparatus from the arbor a, it is only necessary to back the screw n off until the pressure is removed from the spacers b, and then by turning housing q with respect to arbor a the entire apparatus may be removed. If desired any suitable steady-rest may be placed in slidable engagement with the outer surface of housing e to form a bearing therefor and to steady the apparatus during the operation of the machine.

What is claimed as new and desired to be secured by Letters Patent is:

1. Fluid pressure apparatus for urging a tool on an arbor or the like into a predetermined position, comprising, in combination, a first cylinder; first piston means mounted in said first cylinder for sliding movement therein; an annular attaching member mounted substantially within said first cylinder to one side of said first piston means and formed adjacent its periphery with a plurality of bores which extend parallel to the axis of said first cylinder and which are spaced from the axis of said annular attaching member at a greater distance than the radius of said arbor; means for attaching said annular attaching member to an end of said arbor adjacent a spacer thereon; a plurality of pins longer than said bores respectively mounted in the latter for sliding movement, said pins each having one end engaging said first piston means and an opposite end projecting out of the respective bore extending beyond said first cylinder so that said projecting ends of said pins may abut the spacer when said first cylinder is mounted on said arbor; a second cylinder of a smaller diameter than said first cylinder extending from and communicating with the latter at an end wall thereof distant from said annular member; second piston means in said second cylinder defining with said first and second cylinders and said first piston means a chamber in which a pressure fluid is located; and manually operable means mounted on said second cylinder for shifting said second piston means toward said first piston means.

2. Fluid pressure apparatus for urging a tool on an arbor or the like into a predetermined position, comprising, in combination, a first cylinder; first piston means mounted in said first cylinder for sliding movement therein; an annular attaching member mounted substantially within said first cylinder to one side of said first piston means and formed adjacent its periphery with at least three bores which extend parallel to the axis of said first cylinder and which are spaced from the axis of said annular attaching member at a greater distance than the radius of said arbor; means for attaching said annular attaching member to an end of said arbor adjacent a spacer thereon; at least three pins longer than said bores respectively mounted in the latter for sliding movement, said pins each having one end engaging said first piston means and an opposite end projecting out of the respective bore extending beyond said first cylinder so that said projecting ends of said pins may abut the spacer when said first cylinder is mounted on said arbor; a second cylinder of a smaller diameter than said first cylinder extending from and communicating with the latter at an end wall thereof distant from said annular member; second piston means in said second cylinder defining with said first and second cylinders and said first piston means a chamber in which a pressure fluid is located; and manually operable means mounted on said second cylinder for shifting said second piston means toward said first piston means.

3. Fluid pressure apparatus for urging a tool on an arbor or the like into a predetermined position, comprising, in combination, a first cylinder; first piston means mounted in said first cylinder for sliding movement therein; an annular attaching member mounted substantially within said first cylinder to one side of said first piston means and formed adjacent its periphery with a plurality of bores which extend parallel to the axis of said first cylinder and which are spaced from the axis of said annular attaching member at a greater distance than the radius of said arbor, said annular member being formed at its inner periphery with a thread adapted to engage a thread on an end of the arbor for attaching said first cylinder to an end of an arbor adjacent a spacer thereon; a plurality of pins longer than said bores respectively mounted in the latter for sliding movement, said pins each having one end engaging said first piston means and an opposite end projecting out of the respective bore extending beyond said first cylinder so that said projecting ends of said pins may abut the spacer when said first cylinder is mounted on said arbor; a second cylinder of a smaller diameter than said first cylinder extending from and communicating with the latter at an end wall thereof distant from said annular member; second piston means in said second cylinder defining with said first and second cylinders and said first piston means a chamber in which a pressure fluid is located; and manually operable means mounted on said second cylinder for shifting said second piston means toward said first piston means.

References Cited in the file of this patent

UNITED STATES PATENTS

| 1,265,709 | Dies | May 7, 1918 |
| 1,964,524 | McIntosh | June 26, 1934 |
| 2,571,265 | Leufven | Oct. 16, 1951 |